(12) United States Patent
Wang et al.

(10) Patent No.: US 8,456,956 B2
(45) Date of Patent: Jun. 4, 2013

(54) METHOD OF DISPLAYING UNDERWATER DETECTION IMAGE AND UNDERWATER DETECTION DEVICE

(75) Inventors: Yong Wang, Nishinomiya (JP); Masanori Ito, Miyagi (JP); Ikuo Matsuo, Miyagi (JP)

(73) Assignees: Furuno Electric Co., Ltd., Nishinomiya (JP); Tohoku Gakuin University, Sendai (JP)

( * ) Notice: Subject to any disclaimer, the term of this patent is extended or adjusted under 35 U.S.C. 154(b) by 399 days.

(21) Appl. No.: 12/777,101

(22) Filed: May 10, 2010

(65) Prior Publication Data

US 2010/0284248 A1    Nov. 11, 2010

(30) Foreign Application Priority Data

May 11, 2009    (JP) .................................. 2009-114284

(51) Int. Cl.
*G01S 15/96*    (2006.01)

(52) U.S. Cl.
USPC ................................ 367/107; 367/99; 367/88

(58) Field of Classification Search
USPC ............................................. 367/107, 88, 99
See application file for complete search history.

(56) References Cited

U.S. PATENT DOCUMENTS

| | | |
|---|---|---|
| 5,561,641 A | 10/1996 | Nishimori et al. |
| 2010/0284248 A1* | 11/2010 | Wang et al. ...................... 367/88 |
| 2011/0082644 A1* | 4/2011 | Imasaka et al. ............... 701/217 |

FOREIGN PATENT DOCUMENTS

| | | | |
|---|---|---|---|
| GB | 2 430 743 A | | 4/2007 |
| JP | 62-2184 A | | 1/1987 |
| JP | 3-291585 A | | 12/1991 |
| JP | 11-316277 A | | 11/1999 |
| JP | 11316277 A | * | 11/1999 |
| JP | 2004-301737 A | | 10/2004 |
| JP | 2004301737 A | * | 10/2004 |
| JP | 2005-249398 A | | 9/2005 |
| JP | 2006-162480 A | | 6/2006 |
| JP | 2006162480 A | * | 6/2006 |

* cited by examiner

*Primary Examiner* — Daniel Pihulic
(74) *Attorney, Agent, or Firm* — Birch, Stewart, Kolasch & Birch, LLP

(57) ABSTRACT

A method and device for displaying an underwater detection image is provided, in which an ultrasonic signal having a predetermined beam width is periodically transmitted underwater, receives a signal reflected on a detection target object which moves underwater, generates information on the detection target object based on the received signal, and displays the information on a display module. The method includes periodically detecting the detection target object and a position thereof based on the received signal, coupling the same detection target objects by associating the same based on the detection target object and the position periodically detected, and associating a displacement symbol corresponding to a change in a position of the detection target object with the coupled detection target object, and displaying the displacement symbol at the detected position of the detection target object at least on a two-dimensional position coordinates displayed in the display module.

15 Claims, 18 Drawing Sheets

FM TRANSMISSION SIGNAL

MATCHED FILTER INPUT SIGNAL (RECEIVED SIGNAL)

MATCHED FILTER OUTPUT SIGNAL

# METHOD OF DISPLAYING UNDERWATER DETECTION IMAGE AND UNDERWATER DETECTION DEVICE

CROSS-REFERENCE TO RELATED APPLICATION(S)

This application claims priority under 35 U.S.C. §119 to Japanese Patent Application No. 2009-114284, which was filed on May 11, 2009, the entire disclosure of which is hereby incorporated by reference.

TECHNICAL FIELD

The present invention relates to a method of displaying an underwater detection image and an underwater detection device for periodically transmitting underwater an ultrasonic signal having a predetermined beam width, receiving a signal reflected on a detection target object which moves underwater, generates information on the detection target object based on the received signal, and displaying the information on a display module.

BACKGROUND

Conventionally, for investigation on an amount of marine resources, quantitating fish finders which detect a length of each single fish and display detection results on a display are known. Such kind of the quantitating fish finder is disclosed in JP2005-249398(A), for example. In this disclosure, the fish finder derives a ratio of a sound pressure level of an ultrasonic wave transmitted from a transducer and a sound pressure level of an echo which reflects on a fish (i.e., reflection intensity or target strength TS), and calculates a length of the fish (fish length L) based on the obtained target strength TS. Between the target strength TS and the fish length L, it is known that a relation of TS=20 log L+20logA is true (here, "A" is a coefficient determined by a signal frequency and a fish kind). The fish length L information on each single fish obtained by the quantitating fish finder is displayed in a sub display area provided adjacent to a main display area where so-called a fish finder image is displayed in a form of histogram for every predetermined fish size range; thereby enabling visual recognition of the measured values of the fish sizes.

JP2005-249398(A) displays by a predetermined graph the number of the measured fish (fish count) and the fish lengths which are measurement results, and by displaying a symbol of each single fish in the fish finder image of the main display area, visual recognition of a relation of the length of each single fish, a water depth, and an underwater distribution (refer to FIGS. 5(B) and 5(C) of JP2005-249398(A)) is substantially enabled. However, JP2005-249398(A) calculates the fish length and the fish quantity only from a viewpoint of quantitative observation, and carries out the graphical representation of the results in the sub display area, and information which lacks in the graphical representation are supplemented with the display contents of the fish finder image of the main display area. Therefore, in JP2005-249398(A), there is no anticipation and motivation of observing each swimming fish and no configuration therefor is described.

SUMMARY

The present invention is made in view of the above situations, and provides a method of displaying an underwater detection image and an underwater detection device that allows one to easily observe a swimming state of each detection target object which moves underwater, such as a single fish.

According to an aspect of the invention, an underwater detection device is provided, in which an ultrasonic signal having a predetermined beam width is periodically transmitted underwater, and receives a signal reflected on a detection target object moving underwater, generates information on the detection target object based on the received signal, and displays the information on a display module. The device includes a detection module for periodically detecting the detection target object and a position thereof based on the received signal, a coupling module for coupling the same detection target objects by associating the same based on the detection target object and the position periodically detected by the detection module, an image display control module for associating a displacement symbol corresponding to a change in a position of the detection target object with the detection target object coupled by the coupling module, and displaying the displacement symbol at the detected position of the detection target object at least on a two-dimensional position coordinates displayed in the display module.

According to the aspect of the invention, the ultrasonic signal having the predetermined beam width is periodically transmitted underwater, and is received after being reflected on the detection target object which moves underwater, such as a fish or a small animal. The detection target object and its position are periodically detected based on the received signal, and the association (i.e., coupling processing) is performed for the same detection target objects based on the detected detection target object and its position. The displacement symbol corresponding to the change in a position of the detection target object is associated with the coupled detection target object. Meanwhile, a screen image display is made at least by the two-dimensional position coordinates on the display module, and the displacement symbol is displayed corresponding to the detected position of the detection target object in the screen image. Thus, as a result of displaying the displacement symbol corresponding to the detection target object so as to correspond to the detected position for every transmission, it becomes possible to easily observe a swimming state of the corresponding detection target object by observing the displayed state of the displacement symbol for every transmission.

The coupling module may exclude, from a candidate for the coupling, the detection target object of which a speed of position change obtained based on the detected position and a transmission cycle exceeds a predetermined value.

The coupling module may exclude, from a candidate for the coupling, the detection target object of which a posture angle exceeds a predetermined value based on the positions detected by two consecutive transmissions.

The underwater detection device may further include a calculation module for calculating quantitative information of the detection target object base on the received signal of the detection target object detected by the detection module. The image display control module may associate a quantitative symbol corresponding to the quantitative information of the detection target object with the detection target object coupled by the coupling module, and display the quantitative symbol at the detected position of the detection target object at least on the two-dimensional position coordinates displayed in the display module so as to be associated with the displacement symbol.

The calculation module may calculate information on a length of the detection target object as the quantitative information.

The image display control module may change a size of the quantitative symbol according to the information on the length of the detection target object.

The image display control module may display the quantitative symbol at a position obtained based on the latest received signal.

The image display control module may display, as the displacement symbol, a line segment having a length corresponding to a change in the position from the quantitative symbol toward the position obtained based on the last received signal.

The calculation module may calculate the length of the detection target object based on a reflection intensity of the received signal, where it may calculate a posture angle of the detection target object in response to two consecutive transmissions of the ultrasonic signal, and correct the reflection intensity using the posture angle.

The image display control module may change at least a display color of the quantitative symbol for every depth range which is a division of a detection range.

The underwater detection device may further include a depth range selection operating module for allowing one to select a depth range. The image display control module may change a display color of at least one of the quantitative symbol and the displacement symbol of the detection target object contained in the selected depth range into a specific color.

The underwater detection device may further include a size range selection operating module for allowing one to select a size range of the length of the detection target object. The image display control module may change a display color of at least the quantitative symbol of the detection target object contained in the selected size range into a specific color.

The image display control module may selectively display in a display mode of a shipboard view where a distance from a vertical line in a radial direction from a center is displayed at an appropriate display location of the display module, and a display mode of an underwater view where a detection distance from an upper part to below is displayed at an appropriate display location of the display module.

The image display control module may selectively display in a display mode of three-dimensional views.

The underwater detection device may further include an average value calculation module for calculating an average value of lengths of the detection target objects for every depth range, and an average value of the position changes. The image display control module may display the average value of the lengths of the detection target objects and the average value of position changes so as to be associated with a depth range of the three-dimensional view.

According to another aspect of the invention, a method of displaying an underwater detection image is provided, in which an ultrasonic signal having a predetermined beam width is periodically transmitted underwater, receives a signal reflected on a detection target object which moves underwater, generates information on the detection target object based on the received signal, and displays the information on a display module. The method includes periodically detecting the detection target object and a position thereof based on the received signal, coupling the same detection target objects by associating the same based on the detection target object and the position periodically detected, and associating a displacement symbol corresponding to a change in a position of the detection target object with the coupled detection target object, and displaying the displacement symbol at the detected position of the detection target object at least on a two-dimensional position coordinates displayed in the display module.

BRIEF DESCRIPTION OF THE DRAWINGS

The present disclosure is illustrated by way of example and not by way of limitation in the figures of the accompanying drawings in which the like reference numerals indicate like elements and in which:

FIG. 13A is a basic display screen image, FIG. 13B is a screen image when a depth range is specified, and FIG. 13C is a screen image when a size range of a fish length is specified;

FIG. 15A is a basic display screen image, and FIG. 15B is a screen image when a size range of a fish length is specified;

DETAILED DESCRIPTION

Figure 1:
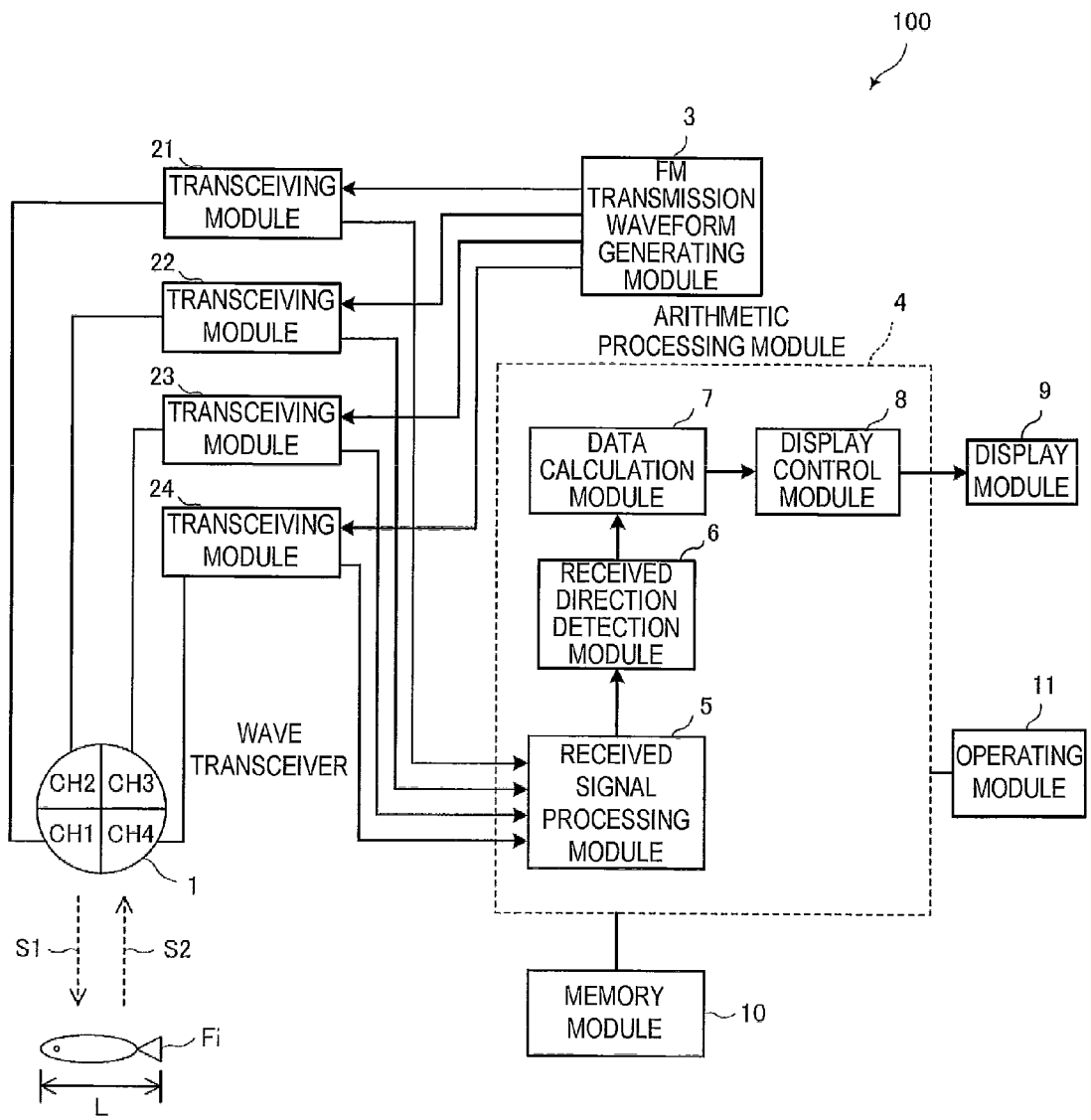
FIG. 1 is a circuit configuration diagram showing an embodiment of a quantitating fish finder to which an underwater detection device according to the present invention is applied.

FIG. 1 is a circuit configuration diagram showing an embodiment of a quantitating fish finder 100 to which an underwater detection device according to the present invention is applied. In FIG. 1, a wave transceiver 1 is fixed to a bottom or the like of a ship. The wave transceiver 1 transmits underwater an ultrasonic wave, and receives a signal reflected on a fish or small animal to be a target of detection which moves underwater (hereinafter, referred to as a "detection target object"). The received result is displayed on a display module 9 arranged inboard or the like via signal wires. Hereinafter, this embodiment is described in regard to a single fish as an example of the detection target object.

Although not shown in the figure, the wave transceiver 1 includes a predetermined number of transducers which are integrally bundled, and oscillating faces (wave transmission surface) of the transducers are oriented so as to form a flat surface as the whole. The wave transmission surface of the wave transceiver 1 is divided into four sections in its circumferential direction, and the divided faces serve as channels CH1-CH4. The channels have common directional characteristics, especially, a predetermined directional width of 7°, for example. The wave transceiver 1 receives an echo of the ultrasonic wave which reflects on a single fish Fi to be a detection target by each of the channels CH1-CH4.

In regard to a relation between each of the channels CH1-CH4 and a ship's bearing, the channels CH1 and CH4 are on the fore side, the channels CH2 and CH3 are on the aft side, the channels CH1 and CH2 are on the starboard side, and the channels CH3 and CH4 are on the portside. When transmitting an ultrasonic signal which is a detection pulse, the wave transceiver 1 transmits the ultrasonic wave from the transducers of all the channels CH1-CH4 in the same phase, and when receiving an echo, it is able to receive the echo from the fore-aft direction and the starboard-port direction within the directional width by the combination of the channel CH1 and CH4, the combination of the channel CH2 and CH3, the combination of channel CH1 and CH2, and the combination of channel CH3 and CH4.

Transceiving modules 21-24 are connected with the respective transducers of the channels CH1-CH4 of the wave transceiver 1 so as to correspond thereto. The transceiving modules 21-24 includes a transmission circuit for supplying a transmission signal generated by an FM transmission waveform generating module 3 to each transducer of the channels CH1-CH4 of the wave transceiver 1, a reception circuit for performing processing of amplification and the like to the echo signal received by each transducer, and a transmission-reception switch circuit for switching the transmission and reception.

The FM transmission waveform generating module 3 is a block for generating a waveform of an FM (Frequency Modulation) signal used as the transmission signal. The FM transmission waveform generating module 3 has a predetermined transmission time width (for example, tens of microseconds), and causes a frequency to chirp within its predetermined range during the time period. In this embodiment, a center frequency is 100 kHz, a lower frequency limit is 70 kHz, and a higher frequency limit is 130 kHz, and the generating module 3 causes the chirp from the lower frequency limit to the higher frequency limit.

An arithmetic processing module 4 includes a microcomputer, for example, and functions as a received signal processing module 5, a received direction detection module 6, a data calculation module 7, and a display control module 8, by executing control programs recorded on a predetermined memory module (not illustrated). The received signal processing module 5 includes a correlation processing function module which performs correlation processing by comparing the received signal received by the wave transceiver 1 with a reference signal defined in advance to extract the received signal with a high distance resolution, and a single fish separate extraction function module which carries out separate extraction of a single fish out of the extracted received signal. The single fish separate extraction function module also calculates depth information on the extracted single fish. In this embodiment, the depth is a distance underwater which goes in the vertical direction with respect to the wave transmission surface of the wave transceiver 1 or the water surface. The distance information corresponding to a time from transmission to reception is corrected by the received direction to be converted into the depth. For example, if the received direction is the vertical direction, the distance information serves as the depth information as it is. The received direction detection module 6 detects the received direction based on the received signals of the channels CH1-CH4 regarding the single fish which are extracted by the received signal processing module 5.

The data calculation module 7 performs coupling processing in the temporal direction of the single fish detected by the single fish separate extraction function module of the received signal processing module 5 and the received direction detection module 6, and processing which converts (calculates) a reflection intensity (target strength) into a fish length. The display control module 8 generates image data to be displayed on the display module 9, and performs a display control according to a user's operation via an operating module 11. The details of the data calculation module 7 and the display control module 8 will be described later referring to FIG. 2.

The quantitating fish finder 100 has a predetermined casing, and the display module 9 is provided to the casing so that its display screen exposes. The display module 9 may include a liquid crystal display, a plasma display or the like, and may be provided with a video RAM for one screen image and the like. The operating module 11 includes a transparent pressure-sensitive sensor, such as a touch panel, laminated on an appropriate location of the quantitating fish finder 100 or the display screen of the display module 9. The operating module 11 allows one (user) to issue various instructions related to detection and display. A part of the FM transmission waveform generating module 3 may be constituted with software to generate the FM signal in digital to output it to an electric power amplifying circuit module (not illustrated).

Figure 3A:
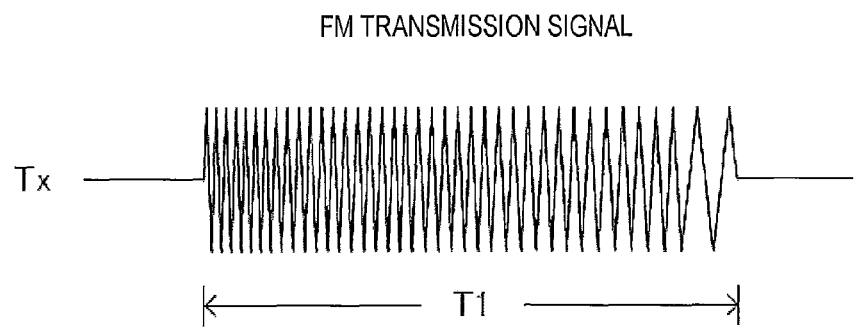
FIG. 3A is an example of a waveform chart of a transmission signal.

Next, referring to FIGS. 3A to 3C, 4A and 4B, and 5 to 7, detection of the target single fish received by the quantitating fish finder 100, and its received direction and the distance (depth), that is, detection of a three-dimensional position with respect to the wave transceiver 1, is described. The FM transmission waveform generating module 3 generates a waveform of a transmission signal Tx as shown in FIG. 3A, and outputs it to the transmission and reception modules 21-24. The transmission signal Tx is a pulse having a time width T1 which includes a sine wave burst signal which is frequency modulated, and as described above, it changes continuously from the frequency of 130 kHz to 70 kHz during the time width T1 (the frequency gradually decreases with time). Each transducer of the wave transceiver 1 is excited by this signal, and transmits underwater an ultrasonic signal S1 having the same waveform as that of FIG. 3A.

Figure 3B:
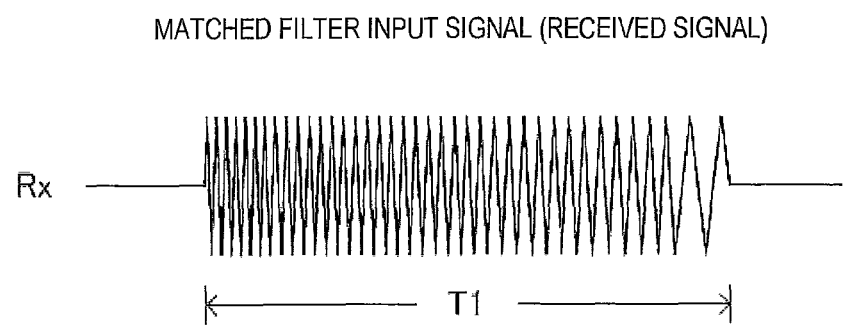
FIG. 3B is an example of a waveform chart of the received signal.

When the pulse of the ultrasonic signal S1 transmitted underwater reflects on the target fish Fi and comes back as an echo S2, the echo S2 is received by the wave transceiver 1 and sent to the transmission and reception modules 21-24. As shown in FIG. 3A, the waveform of the received signal Rx at this time is fundamentally the same waveform as the transmission signal Tx of FIG. 3B. Note that the received signal in fact contains many noises due to the influence of the echoes from underwater floating objects, propeller noises or the like, and it will not be an ideal waveform such as shown in FIG. 3B.

However, the received signal and the transmission signal are treated herein as the same waveform for convenience.

Figure 4A:
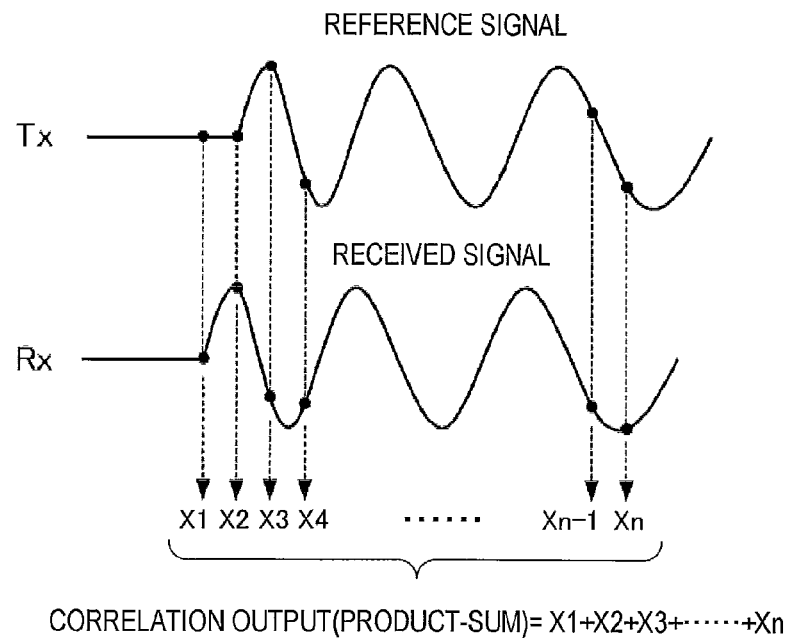
FIGS. 4A and 4B are diagrams illustrating a principle of correlation processing using a matched filter.
Figure 4B:
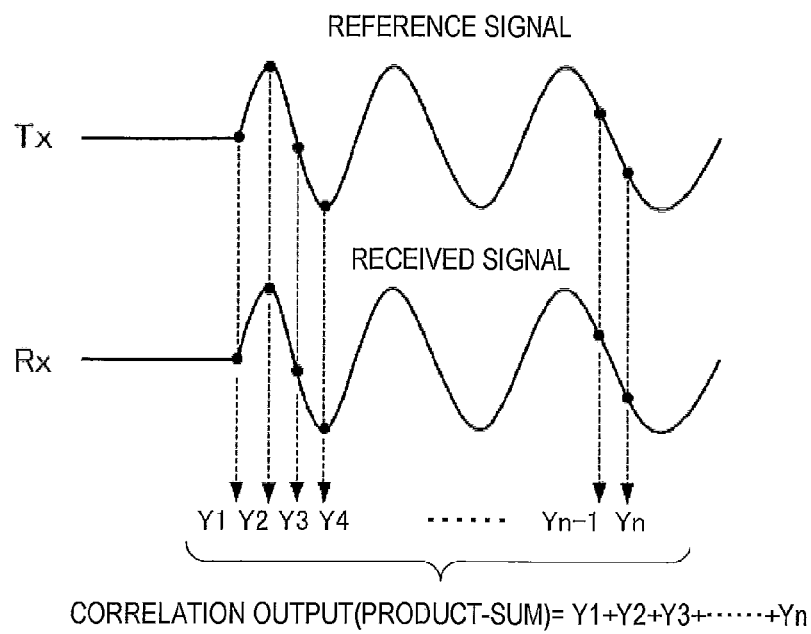

The received signal processing module 5 includes a matched filter. FIG. 4A is a diagram illustrating the principle of correlation processing using the matched filter. The reference signal Tx of FIG. 4A is a chirp signal in which a frequency decreases with time in this embodiment. Waveform data of the reference signal Tx is stored in advance in a memory (not illustrated). FIG. 4B shows a signal compared with the reference signal Tx, specifically received signals Rx outputted from the transmission and reception modules 21-24 (i.e., an input signal of the received signal processing module 5).

In the correlation processing, multiplication of a level of the received signal Rx by a level of the reference signal Tx at each time and addition of the products are performed (product-sum operation), while shifting phases of the reference signal Tx and the received signal Rx little by little. FIG. 4A shows a situation of the product-sum operation at a certain time, where the multiplication of the level value of the received signal Rx by the level value of the reference signal Tx is performed at a predetermined sampling interval, and the products X1, X2, ..., and Xn are added over a given sampling interval. Then, the added value of X1+X2+ ... +Xn is set to a correlation output. FIG. 4B shows a situation of the product-sum operation at another time point, where the multiplication of the level value of the received signal Rx by the level value of the reference signal Tx are also performed at the predetermined sampling interval, and the products Y1, Y2, ..., and Yn are added over the sampling interval. Then, the added value Y1+Y2+ ... +Yn is set to the correlation output.

The received signal processing module 5 outputs a signal having a level corresponding to a degree of coincidence between the received signal Rx and the reference signal Tx. The level of the output signal will be higher as the degree of coincidence becomes higher, and, on the other hand, the level of the output signal will be lower as the degree of coincidence becomes lower. Because the degree of coincidence between the phases of the reference signal Tx and the received signal Rx is low in the case of FIG. 4A, the value of the correlation output becomes small. However, because the phases of the reference signal Tx and the received signal Rx is in agreement with each other in the case of FIG. 4B, the value of the correlation output becomes the maximum. In this way, according to the correlation processing, because detection of the signal is performed with the level information on the signal while taking the phase information into the detection by the product-sum operation, the detection accuracy of the signal can be raised compared with the case where the signal detection is performed only based on the level.

Figure 3C:
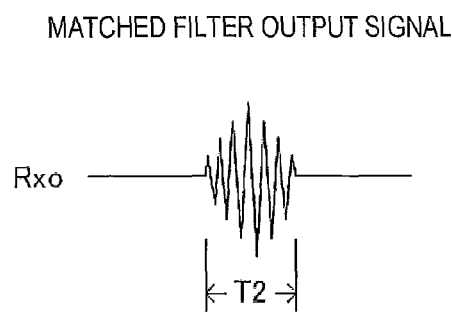
FIG. 3C is an example of a waveform chart of a correlation processing output signal.

By performing the above correlation processing, a received signal Rxo corresponding to the reference signal Tx as shown in FIG. 3C is extracted by the matched filter. Although the received signal Rxo is a burst signal similar to the transmission signal Tx, it consists of a signal of the same band (for example, about 100 kHz) as the reference signal Tx, and the signals of other bands are eliminated. That is, the pulse width T2 of the received signal Rxo is shorter than the pulse width T1 of the transmission signal Tx. In this way, because the received signal Rxo outputted from the received signal processing module 5 is pulse-compressed as the result of correlation processing by the matched filter, an echo resolution is improved and, thus, each single fish can be separated with a sufficient accuracy by the single fish separate extraction function module which will be described below. Note that the output signal Rxo of the matched filter shown in FIG. 3C in fact contains a very small level of signal over the same interval as T1 other than the interval of T2; however, this signal can be practically disregarded, and it can be considered that the pulse width is compressed into T2 from T1 as a matter of fact.

In FIG. 3A, the level of the FM transmission signal is set constant over the time width T1; however, by applying envelope processing using a suitable window function (for example, a hanning window), the influence of side lobes given to the received signal can be suppressed.

Subsequently, the single fish separate extraction function module analyzes the received signal Rxo, and performs the separate extraction processing of each single fish. This principle is described referring to FIGS. 5 and 6.

Figure 5:
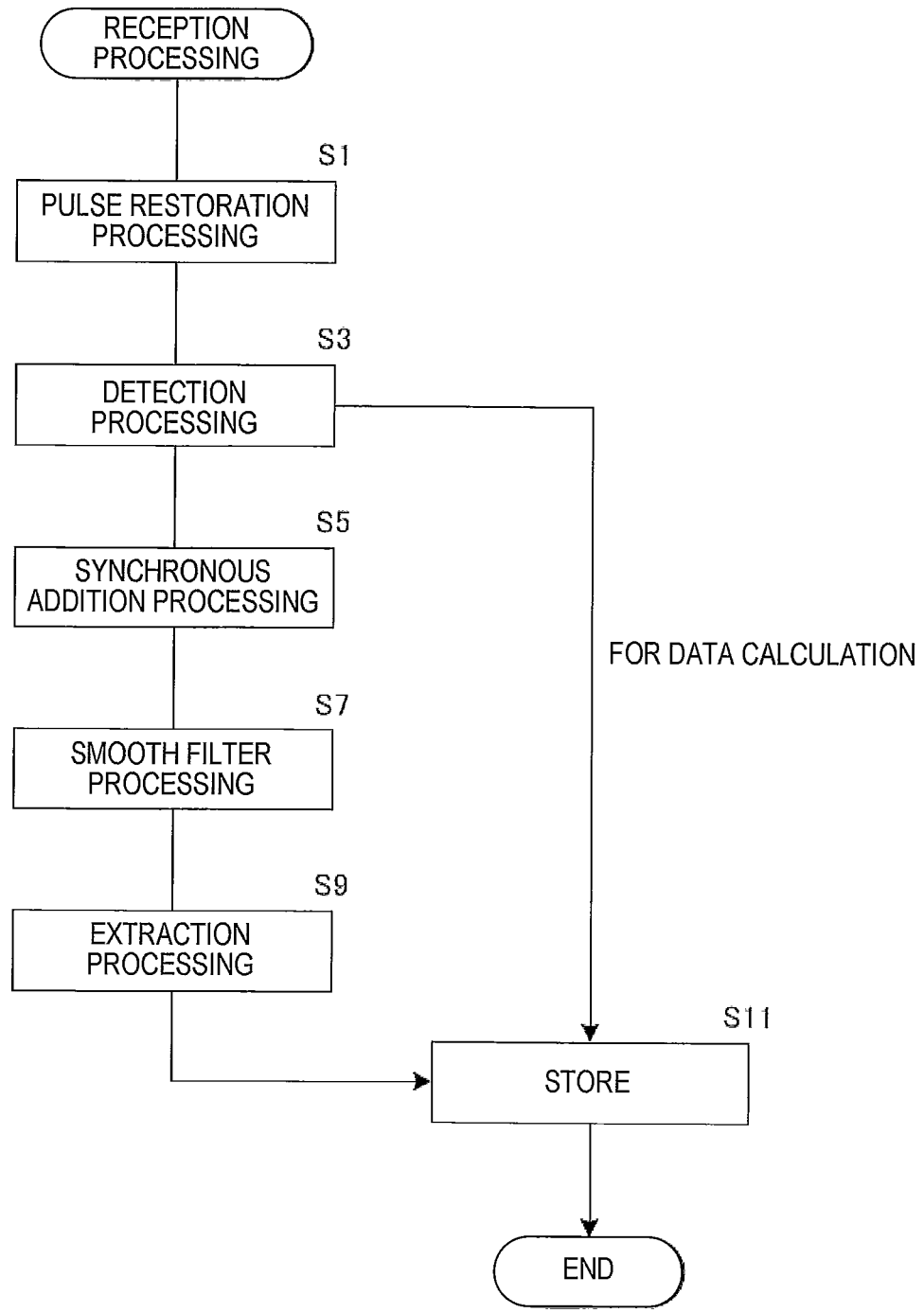
FIG. 5 is a flowchart showing a reception procedure.

FIG. 5 is a flowchart showing a reception procedure. The processing shown in this flowchart is implemented by the arithmetic processing module 4 executing the processing program stored in a storage medium of a processing information storage module 103.

In FIG. 5, the received signal Rxo is extracted by pulse restoration processing (Step S1), and the received signal Rxo is then detected by detection processing (Step S3). That is, rectangular detection is applied to the received signal Rxo to generate data for the four channels CH1-CH4 (complex data which consists of a real component I and an imaginary component Q). Subsequently, the complex data generated by the detection processing branches by synchronous addition processing into data for data calculation (for azimuth estimation) and data for single fish detection, and amplitudes of the channels CH1-CH4 are derived for the single fish detection data to apply addition (Step S5). In the synchronous addition processing, the amplitudes may be derived after the signals of the channels CH1-CH4 are added for the single fish detection data. Subsequently, the data obtained by the synchronous addition processing is smoothed by smooth filter processing to remove noises (Step S7).

Figure 6:
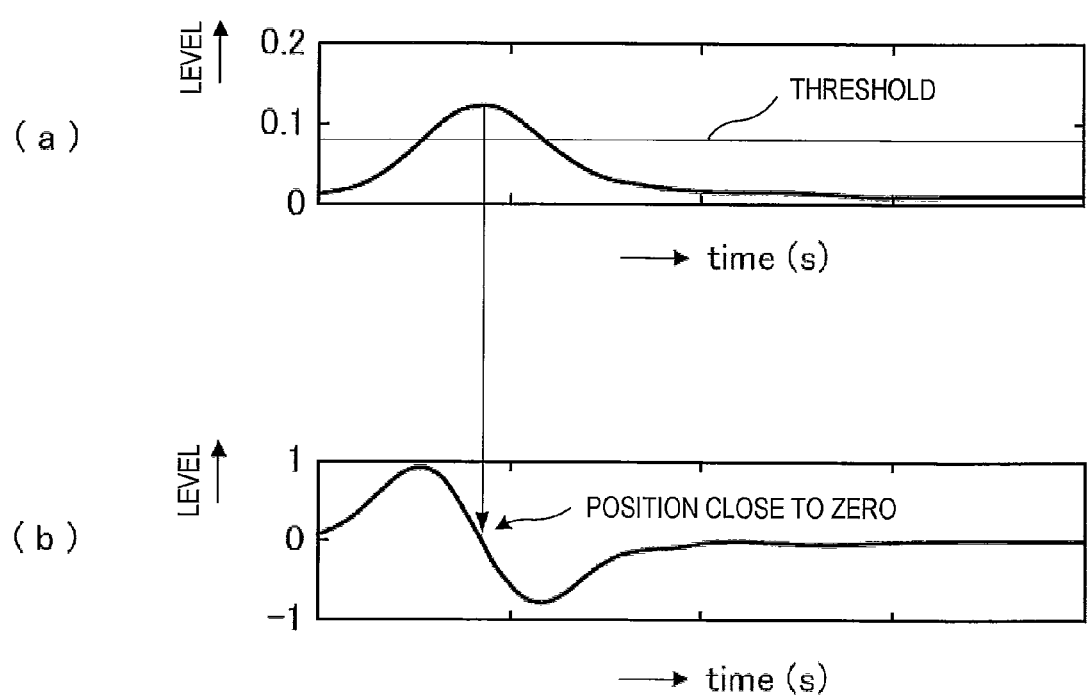
FIG. 6 shows waveform charts, where (a) is a waveform chart showing an example of output data after smooth filter processing, and (b) is a waveform chart after further performing differentiation processing.

In FIG. 6, (a) is a waveform chart showing an example of the output data after the smooth filter processing, and (b) is a waveform chart after further performing differentiation processing. At Step S9, the differentiation processing is further performed to the output data after the smooth filter processing. For the differentiation-processed signal, a timing near zero (zero-cross timing, i.e., a time or a phase after conversion) is derived, and the data for data calculation for the four channels CH1-CH 4 at this timing is extracted as single fish data. The extracted single fish data is stored in a fish information storage module 101 (Step S11).

Figure 7:
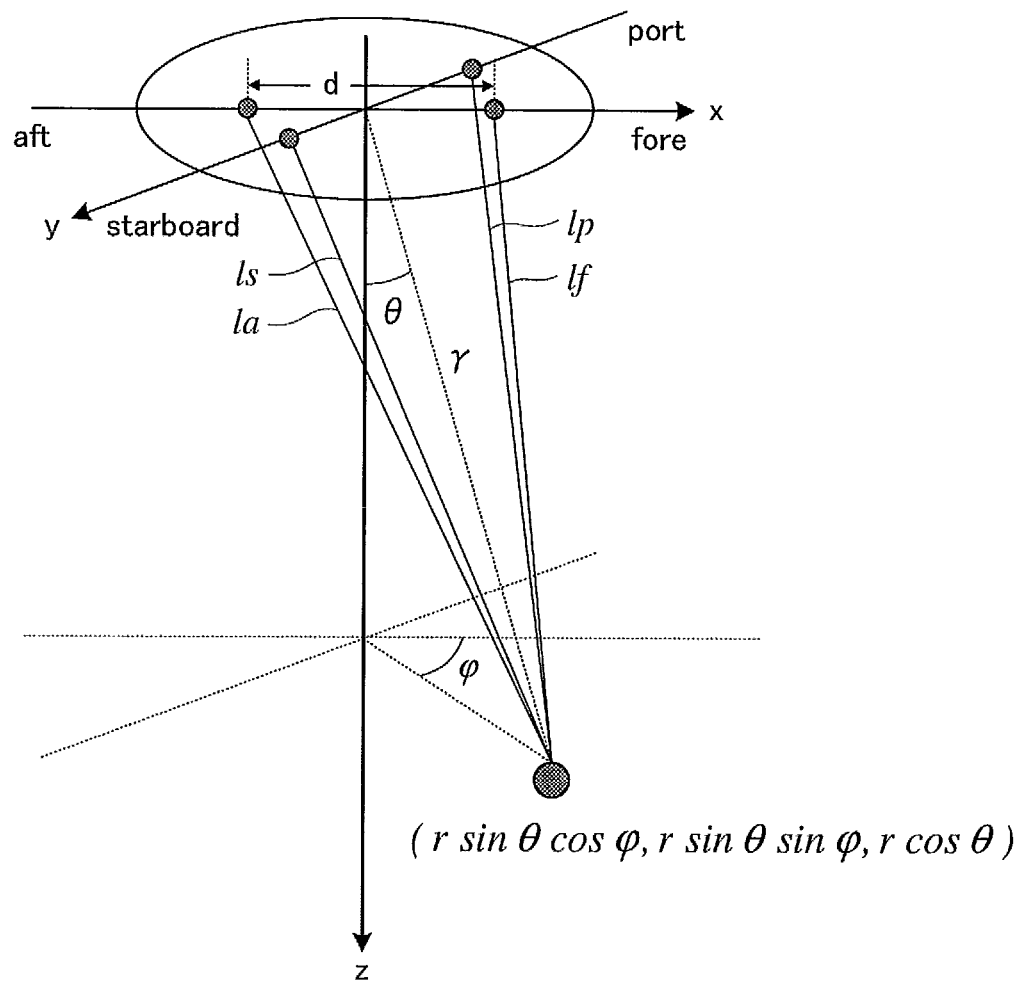
FIG. 7 is a diagram illustrating a detection principle of a received direction by an SSBL (Super Short Base Line) method using a split beam, performed by a received direction detection module.

FIG. 7 is a diagram illustrating a detection principle of the received direction by the SSBL (Super Short Base Line) method using split beams, which is performed by the received direction detection module 6. As the detection principle, there are a detecting method by a time lag and a detecting method by a phase difference. In either case, the received signals at the transducers of the channels CH1 and CH4 on the fore side are added (CH1+CH4), the received signals at the transducers of the channels CH2 and CH3 on the aft side are added (CH2+CH3), the received signals at the transducers of the channels CH1 and CH2 on the starboard side are added (CH1+CH2), and the received signals at the transducers of the channels CH3 and CH4 on the portside are added (CH3+CH4). Subsequently, when using the time lag, the following Equation (1) can be established for an arrival time difference $\Delta x$ in the fore-aft direction of the received signal and an arrival time difference $\Delta y$ in the starboard-port direction, where inter gravity center distances in the fore-aft direction and the starboard-port direction of each of the channels CH1-CH4 are "d," an underwater sound speed is "c," an elevation angle with respect to the vertical direction is "$\theta$," and a deflection angle with respect to the fore direction "φ." As a result, the arrival angles θ and φ can be found by the following Equation (2).

$$\Delta_x = \frac{l_a - l_f}{c} = \frac{d}{c}\sin\theta\cos\varphi \qquad (1)$$
$$\Delta_y = \frac{l_p - l_s}{c} = \frac{d}{c}\sin\theta\sin\varphi$$

$$\theta = \sin^{-1}\left(\frac{c\sqrt{\Delta_x^2 + \Delta_y^2}}{d}\right) \qquad (2)$$
$$\varphi = \tan^{-1}\left(\frac{\Delta_y}{\Delta_x}\right)$$

Similarly, when using the phase difference, the following Equation (3) can be established for δx in the fore-aft direction of the received signal, and δy in the starboard-port direction of the received signal, and, as a result, the positional angles θ and φ can be found by the following Equation (4).

$$\delta_x = k(l_a - l_f) = kd\sin\theta\cos\varphi \qquad (3)$$
$$\delta_y = k(l_p - l_s) = kd\sin\theta\cos\varphi$$

$$\theta = \sin^{-1}\left(\frac{\sqrt{\delta_x^2 + \delta_y^2}}{kd}\right) \qquad (4)$$
$$\varphi = \tan^{-1}\left(\frac{\delta_y}{\delta_x}\right)$$

As described above, the arrival angle (received direction) over 360° azimuth is calculated. Calculation processing of the received direction is performed to all the fish data extracted from the detection range. The calculated received direction information is sequentially stored in the memory module 10 (refer to FIG. 2) as fish information for every single fish (received direction, distance, received signal intensity, etc.) so as to pair up with the extracted single fish data. The calculated received direction information is used in order to correct the level of the received signal based on the directional characteristics of the wave transceiver 1 and the like, as described later. In the transmission and reception modules 21-24, processing of filtering, amplification and the like is performed to the received signal.

Figure 2:
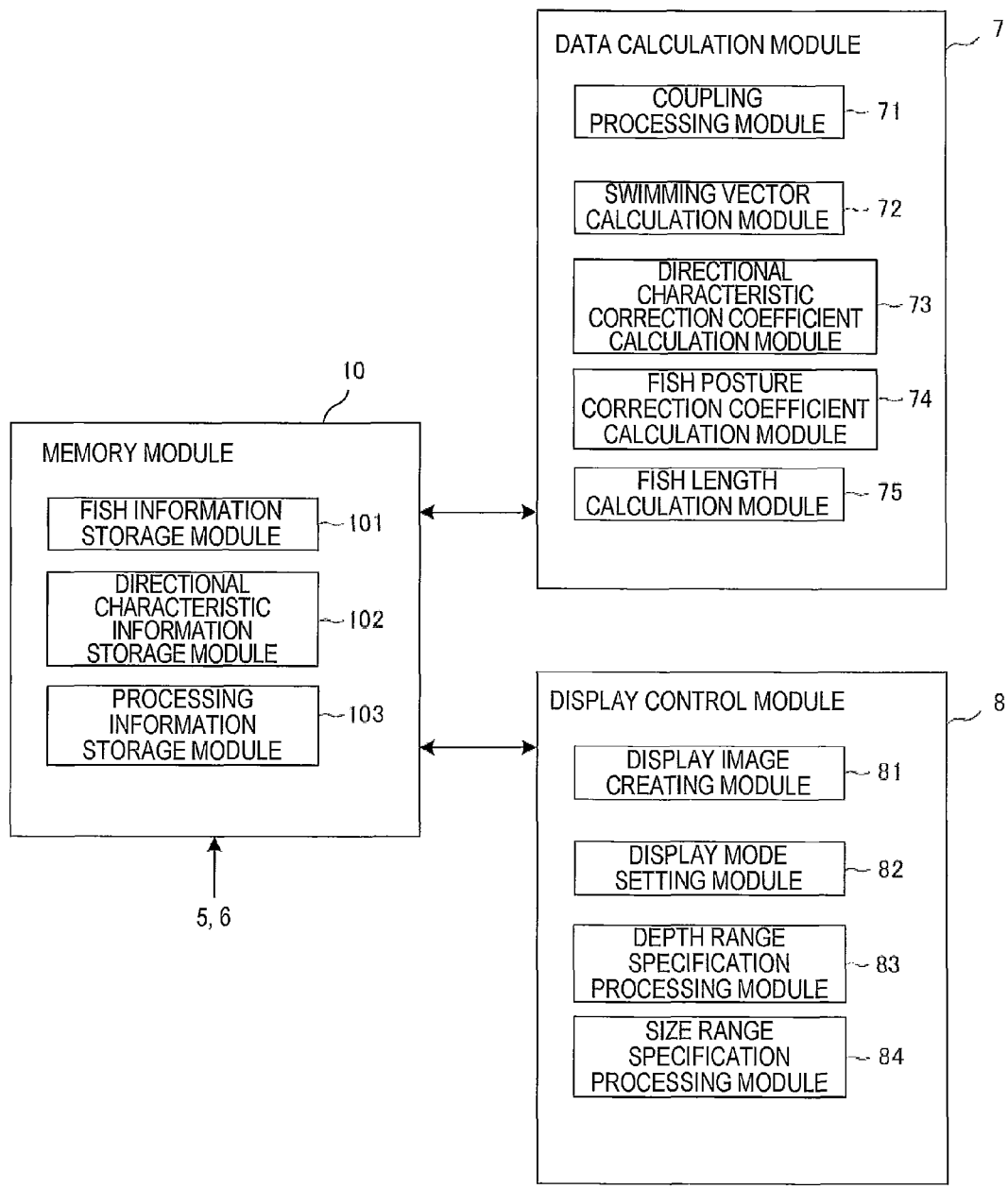
FIG. 2 is a functional block diagram of a data calculation module and a display control module.

FIG. 2 is a functional block diagram of the data calculation module 7 and the display control module 8. The data calculation module 7 includes a coupling processing module 71, a swimming vector calculation module 72, a directional-characteristic correction coefficient calculation module 73, a fish posture correction coefficient calculation module 74, and a fish length calculation module 75. The memory module 10 stores various kinds of processing data. The memory module 10 includes the fish information storage module 101, such as a RAM, which stores, other than information on the received direction and the depth of every single fish (three-dimensional position), fish information on fish length information (an example of the quantitative information) and swimming vector information at least on two transmissions of the last transmission and the current transmission alternately, a directional-characteristic information storage module 102, such as a ROM, which stores directional-characteristic information on the wave transceiver 1, and the processing information storage module 103 which stores equations required for various processing (calculation result table), processing programs, and various image information including symbols for an image display described later, etc.

In this embodiment, the coupling processing module 71 performs primary coupling processing based on three-dimensional position information and secondary coupling processing based on a motion of a fish. In the primary coupling processing, the three-dimensional position information on a single fish detected by the current transmission is coupled as a pair with a single fish falling within a predetermined distance range or a single fish at the closest approach position within the predetermined distance range of the three-dimensional position information on the single fish detected by the last transmission, and they are associated with each other by changing a coupling flag to ON, for example. In the secondary coupling processing, among the fish paired up by the primary coupling processing, pair(s) which does not meet a predetermined condition based on the information calculated by the swimming vector calculation module 72 are excluded. The predetermined condition includes a case where a swimming speed of each single fish is faster than a predetermined threshold (for example, the swimming speed is to travel 5 times or more of a standard fish length per second (synonymous with the swimming distance in a relation with the transmission cycle), and a case where a swimming direction with respect to the depth direction of each single fish (posture angle) inclines more than a predetermined threshold. The swimming speed is calculated based on the difference between the three-dimensional position information detected by the last transmission and the three-dimensional position information detected by the current transmission, and the transmission cycle. The posture angle to the depth direction is calculated based on a ratio of the difference between the depth information detected by the last transmission and the depth information detected by the current transmission, and the difference of the horizontal position information detected by the last transmission and the horizontal position information detected by the current transmission. That is, by distinguishing the single fish exceeding the condition from other fish, the single fish determination according to the biology of fish is possible. The swimming vector calculation module 72 calculates the swimming direction based on the three-dimensional position information detected by the last transmission and the three-dimensional position information detected by the current transmission, and calculates the swimming speed with respect to this direction.

The data calculation module 7 first calculates a target strength TS based on the levels of the transmission signal and the received signal for the single fish to which the coupling flag is set by the coupling processing module 71, and then calculates a fish length based on the target strength TS. It is known that the target strength TS can be calculated by the following Equation (5).

$$TS = 20\log_{10}(SIG) - G + TVG + Bt(\theta) + Br(\theta) - SL - Me - kD \qquad (5)$$

Here, SIG is a level of the received signal of each single fish, G is a reception gain, TVG is a variable time gain which varies according to a distance to the target, Bt(θ) is a correction term of the transmission directivity according to the target direction, Br(θ) is a correction term of the reception directivity according to the target direction, SL is a level of the transmission signal, Me is a received wave sound pressure sensitivity, kD is a correction term according to the posture angle of each single fish, D is a correction function according to the incline angle, and k is its coefficient. Bt(θ) and Br(θ) which are directive correction terms are calculated by the following Equation (6), and are stored in advance in the directional-characteristic information storage module 102. The directional-characteristic correction coefficient calculation module 73 extracts corresponding $Bt(\theta)$ and $Br(\theta)$ from the direction information $\theta$ acquired by the SSBL method described above.

$$Br(\theta) = Bt(\theta) = \left|\frac{2J_1(ka\sin\theta)}{ka\sin\theta}\cos\theta\right| \quad (6)$$

Here, in the above Equation (6), J1 is a first-kind first-order Bessel function, and "a" is a radius of the wave transceiver 1. The fish posture correction coefficient calculation module 74 uses the correction term kD according to the posture angle of each single fish when calculating the target strength TS.

As described above, in the calculation of the target strength TS, the various corrected target strength TS is calculated according to the direction information of the target obtained from the phase difference of the received signal, the directional-characteristic information on the wave transceiver 1, the posture angle, etc. Then, once the target strength TS is found, a fish length L is calculated by the fish length calculation module 75 based on the equation of the target strength TS and the fish length L shown in the following well-known Equation (7).

$$TS = 20\log L + 20\log A \quad (7)$$

Here, "A" is a coefficient determined by a signal frequency and a fish kind. As the coefficient "A" of the fish kind, a corresponding value (for each single fish kind or several kinds) may be read out from the memory module which stores the value in advance, by using necessary information among an ocean space, a depth, a season, a water temperature and the like, for example, to be set into Equation (7).

Figure 8:
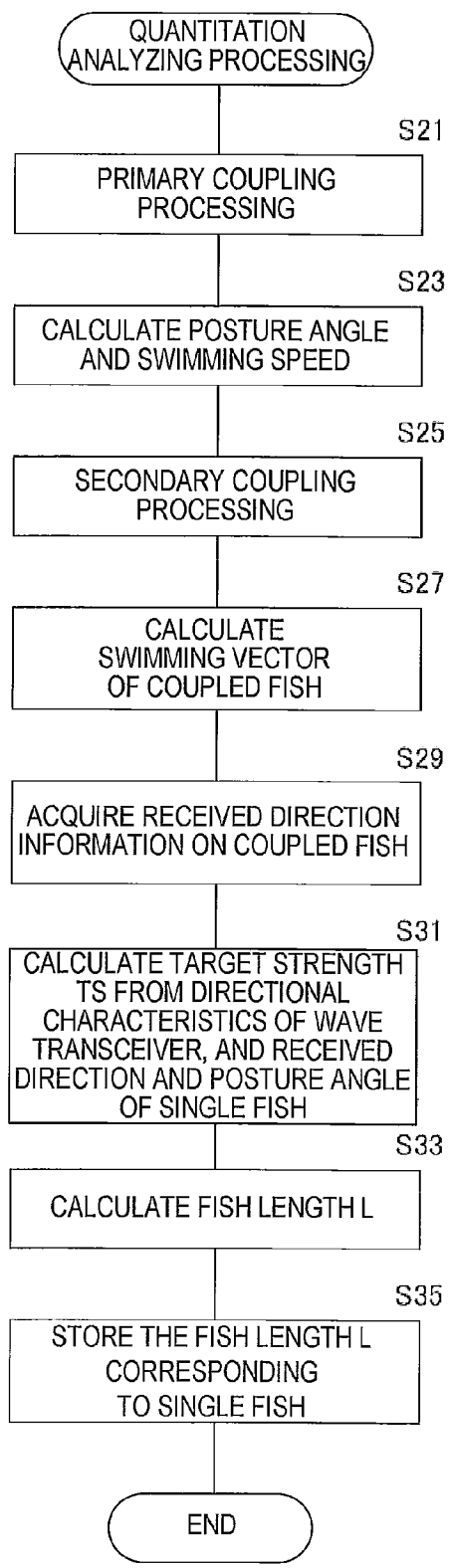
FIG. 8 is a flowchart showing a quantitating analysis procedure.

FIG. 8 is a flowchart showing a quantitating analysis procedure. The processing shown in this flowchart is implemented by the arithmetic processing module 4 executing the processing program stored in the storage medium of the processing information storage module 103.

In FIG. 8, for each of the fish detected by the current transmission, comparison with the position information detected by the last transmission is performed sequentially, the primary coupling processing is performed by determining that the single fish within the predetermined distance range or the single fish in the closest approach distance of the predetermined distance range to be the same single fish (Step S21). Then, a posture angle and a swimming speed from the last detection to the current detection of the single fish are calculated based on the three-dimensional position information and the transmission cycle information on the coupled single fish of the last time and this time (Step S23). Then, the secondary coupling processing is performed (Step S25). That is, if either the posture angle or the swimming speed does not meet the predetermined condition, it is excluded from a candidate for the coupling, and if both the conditions are met, the coupling is maintained.

Then, for the coupled single fish, a swimming vector is calculated based on the stored content of the fish information storage module 101 (Step S27), and received direction information is then acquired (Step S29). Further, based on the directional characteristics of the wave transceiver 1 and the received direction of the target single fish, the posture angle of the target single fish, and the like, the target strength TS of the single fish is calculated by Equation (5) (Step S31), and the fish length L is calculated by Equation (7) (Step S33). The calculated fish length information is stored corresponding to the single fish of the fish information storage module 101 (Step S35).

As shown in FIG. 2, the display control module 8 includes a display image creating module 81, a display mode setting module 82, a depth range specification processing module 83, and a size range specification processing module 84. The display image creating module 81 creates an image to be displayed in the screen image of the display module 9 and transfers the created image to a video RAM. The stored content of the video RAM is repeatedly read out to be displayed on the display module 9 as a still image. The display module 9 includes a main display area where a normal detection image is displayed, and a sub display area where (observed) information on a motion of each single fish is displayed by various display modes, and the display image creating module 81 creates the image to be displayed in each display area. The main display area is a display mode containing the number of transmissions as the horizontal axis (temporal direction) and a depth as the vertical axis, and the received signal is displayed by a color according to the reception level. By scrolling the entire image by a predetermined width in the temporal direction for every transmission cycle, the latest detection signal is displayed at a predetermined leading position of the main display area (for example, right end).

The display mode setting module 82 has two or more display modes to switch to a display image of the display mode selected by an user, as described later. The depth range specification processing module 83 displays an image of the single fish falling within the depth range specified by the user among the displayed fish so as to discriminate it from the images of other fish. The depth range means each range part which is obtained by dividing the detection range into a predetermined number. The size range specification processing module 84 displays an image of the single fish falling within the size range of the fish length specified by the user among the displayed fish so as to discriminate it from the images of other fish.

Figure 9:
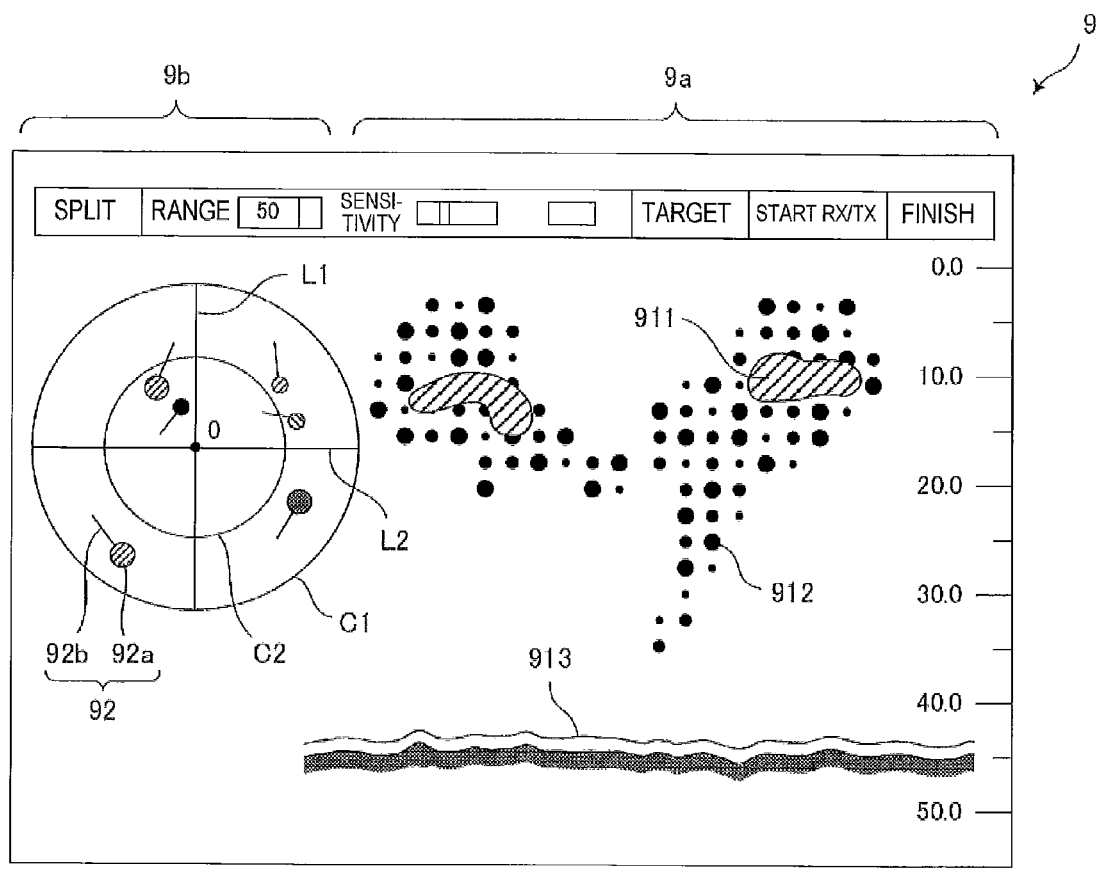
FIG. 9 is a diagram showing an example of an image displayed in a screen image of a display module.

FIG. 9 shows an example of the image displayed in the screen image of the display module. The screen image includes a so-called fish finder screen image 9a that is the main display area, and a single fish observation screen image 9b that is the sub display area. On the fish finder screen image 9a, an underwater image containing a school-of-fish image 911, a single fish image 912, and a sea bed image 913 is displayed. On the single fish observation screen image 9b, single fish images, a depth scale image and the like are displayed. The school-of-fish image 911 is obtained based on the ultrasonic echo reflected on a crowded school of fish, and is displayed so as to classify by a color according to the echo intensity. The single fish image 912 is displayed based on the received signal of the separated single fish so as to classify by a color according to the echo intensity. The single fish separate extraction function module of the received signal processing module 5 fundamentally carries out separation detection of the single fish from the received signal.

Figure 10:
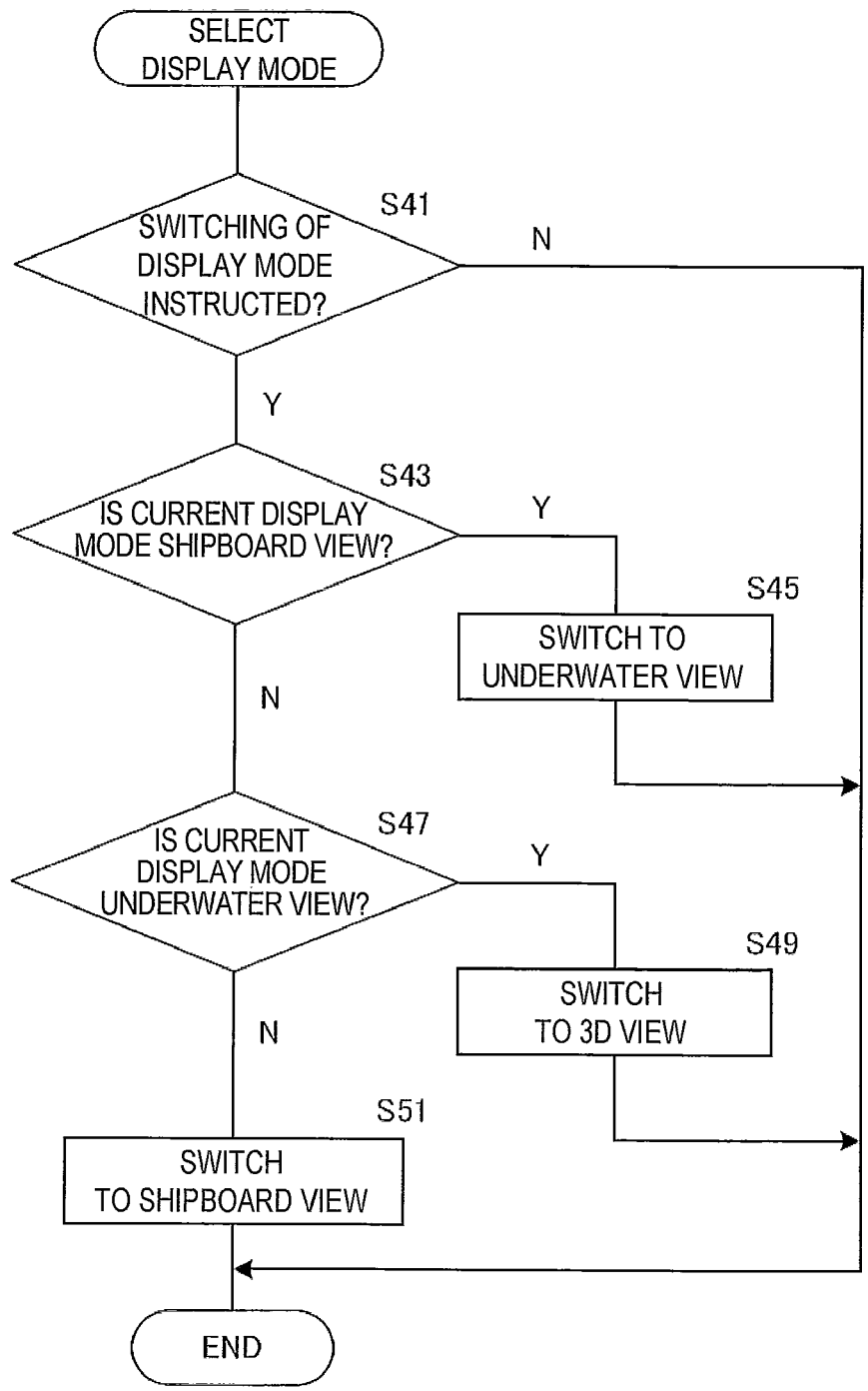
FIG. 10 is a flowchart showing a display mode selection procedure.

FIG. 10 is a flowchart showing a display mode selection procedure. The processing shown in this flowchart is implemented by the display control module 8 executing the processing program stored in the storage medium of the processing information storage module 103.

In FIG. 10, a determination of whether switching of the display mode is instructed from the operating module 11 is made (Step S41), and if there is no switching instruction, the display control module 8 escapes from the flowchart. On the other hand, if there is a switching instruction, the display control module 8 determines whether the current display mode is a shipboard view (Step S43). If it is a shipboard view, the display mode is switched to an underwater view (Step S45), and the display control module 8 escapes from this flow.

On the other hand, if the current display mode is not a shipboard view, a determination of whether the current display mode is an underwater view (Step S47). If it is an underwater view, the display mode is switched to a 3D view (Step S49), and the display control module 8 escapes from this flow. On the other hand, if the current display mode is not an underwater view (that is, if it is a 3D view), the current display mode is switched to a shipboard view (Step S51).

Figure 11:
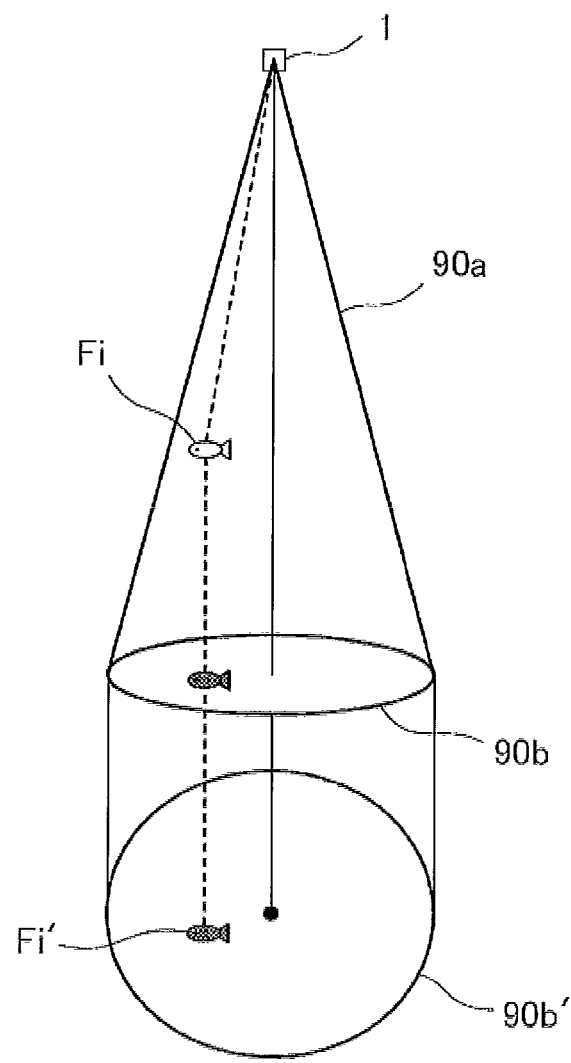
FIG. 11 is a schematic diagram illustrating a display type of a shipboard view.

FIG. 11 is a schematic diagram illustrating a display type of the shipboard view. FIG. 11 shows an ultrasonic signal having a predetermined directional width which goes in the vertical direction toward a sea bed 90b from the wave transceiver 1, and it is roughly represented by a cone 90a. A circle 90b' is a plan view of the sea bed 90b. Now, if a fish Fi is at a certain depth, a position thereof which can be specified by orthogonally projecting the position of the fish Fi to the sea bed is set to a display position at the fish Fi'. Therefore, a distance from a vertical line is displayed in a radial direction from the center. In FIG. 11, the depth direction is divided into a predetermined depth ranges. The depth ranges may be set according to the detection range, for example, if the detection range is 50 m, the depth ranges may be set every 10 m, which is ⅕ of the entire detection range. In addition, the fish length is divided into a predetermined size ranges. The size ranges of the fish length may be set every 10 cm.

Figure 12:
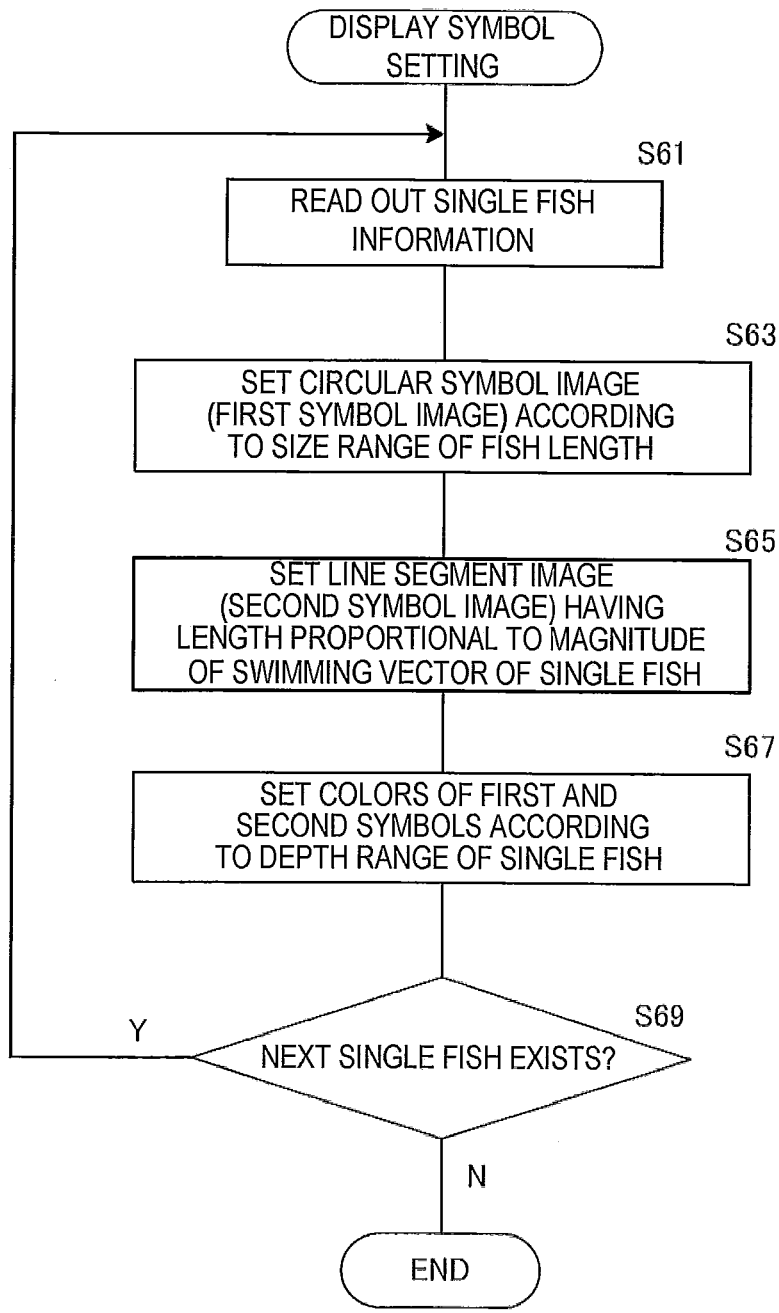
FIG. 12 is a flowchart showing a setting procedure of a display symbol corresponding to each single fish.

FIG. 12 is a flowchart showing a setting procedure of a display symbol corresponding to each single fish. The processing shown in this flowchart is implemented by the display control module 8 executing the processing program stored in the storage medium of the processing information storage module 103.

In FIG. 12, the first information on the single fish detected having for example the shallowest depth is read out from the fish information storage module 101 (Step S61). Subsequently, according to the size range of the single fish, a first symbol (quantitative symbol) having a discriminatable form, for example, a circular symbol image which increases in radius according to the size range (according to an increase in fish length), is set (Step S63). Then, a line segment (second symbol; displacement symbol) image having a length proportional to a magnitude of the vector which is obtained by orthogonally projecting the swimming vector of the single fish onto the display screen image is set (Step S65). The color of the line segment image is preferably the same as that of the first symbol. Subsequently, according to the depth range of the single fish, a color is set in advance, for example, a color which will be lighter as the depth becomes deeper is set to the first and second symbol images. Here, an achromatic color is preferred as the color information determined for the first and second symbol images. The second symbol may be displayed in monochrome.

Subsequently, when the existence of the next single fish is determined and if there is a non-set single fish, the display control module 8 returns to Step S61, and, conversely, if the setting of the display symbols for all the fish is completed, this flow will be ended. The contents of the setting are stored in the fish information storage module 101 for every single fish.

Figure 13A:
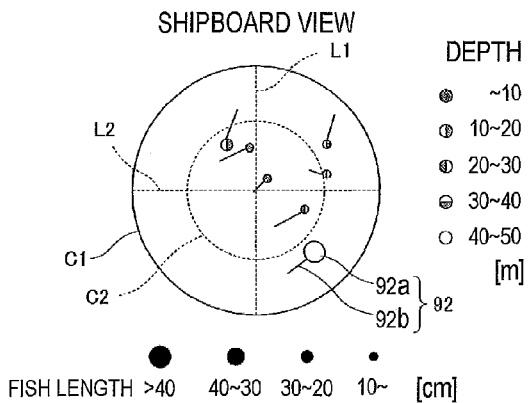
FIGS. 13A to 13C are diagrams illustrating the shipboard view displayed in a single fish observation screen image, where
Figure 13B:
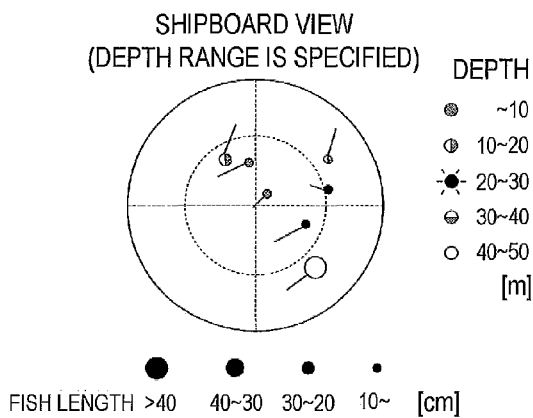
Figure 13C:
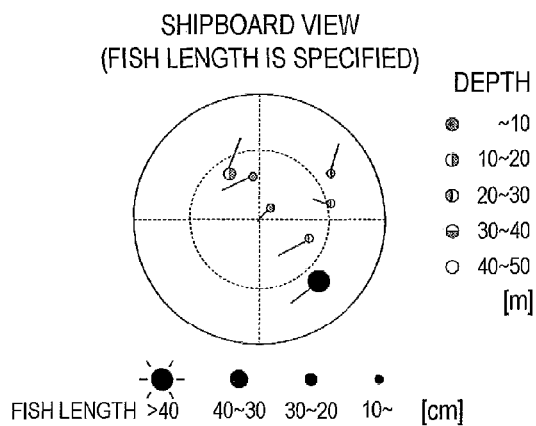

FIGS. 13A to 13C are diagrams illustrating the shipboard view displayed in the single fish observation screen image 9b, where FIG. 13A is a basic display screen image, FIG. 13B is a screen image when the depth range is specified, and FIG. 13C is a screen image when the size range of the fish length is specified.

In FIG. 13A, the basic display screen image includes a center O corresponding to the position of the wave transceiver 1, a circle C1 of a predetermined radius having the center O, and direction assisting scales L1 and L2 which show front and rear, and right and left, respectively. The circle C1 corresponds to a directional angle (azimuth direction). In addition, the circle C2 is displayed at a ½ angle position (½ radius position) of the circle C1 as an angle assisting scale. The shipboard view is displayed with coordinate axes of front and rear, and right and left of the ship, and the directional angle, and, therefore, there is no distance (depth) axis. Therefore, each coordinate in the circle C1 is defined by the received direction of each single fish.

The single fish positioned at the coordinate in the circle C1 is displayed by a first symbol 92a and a second symbol 92b that constitute a single fish image 92. The single fish image 92 is displayed by the number of single fish. The first and second symbols that constitute each single fish image are determined according to the setting procedure of the display symbol shown in FIG. 12. The indication which guides the depth of the single fish displayed and the fish length is displayed at a proper location outside of the circle C1. By the shipboard view method, because the depth cannot especially be specified, it is clarified according to the setting procedure of the display symbol of FIG. 12.

FIG. 13B shows a screen image supposing a case where the depth range of 20 m to 30 m is specified by the operating module 11 in FIG. 13A. In this case, the first symbol 92a and the second symbol 92b that constitute the single fish image 92 of all the fish contained in the specified depth range of 20 m to 30 m are changed into a special color (specific color) which is discriminatable from colors of fish images outside the specified depth range. For example, it is changed into a predetermined chromatic color (e.g., red) when the single fish image is displayed by an achromatic shade in the basic display screen image.

FIG. 13C shows a screen image supposing a case where a size range of 40 cm or more is specified by the operating module 11 as the fish length in FIG. 13A. In this case, the first symbol 92a and the second symbol 92b that constitute the single fish image 92 of all the fish contained in the specified size range of 40 cm are changed into a special color discriminatable from a color of fish image outside the specified size range. For example, it is changed into a predetermined chromatic color (e.g., red) when the single fish image is displayed by an achromatic shade in the basic display screen image. Note that in FIGS. 13B and 13C, the corresponding guides are also changed into the specific color to enable visual recognition of the specified range.

Figure 14:
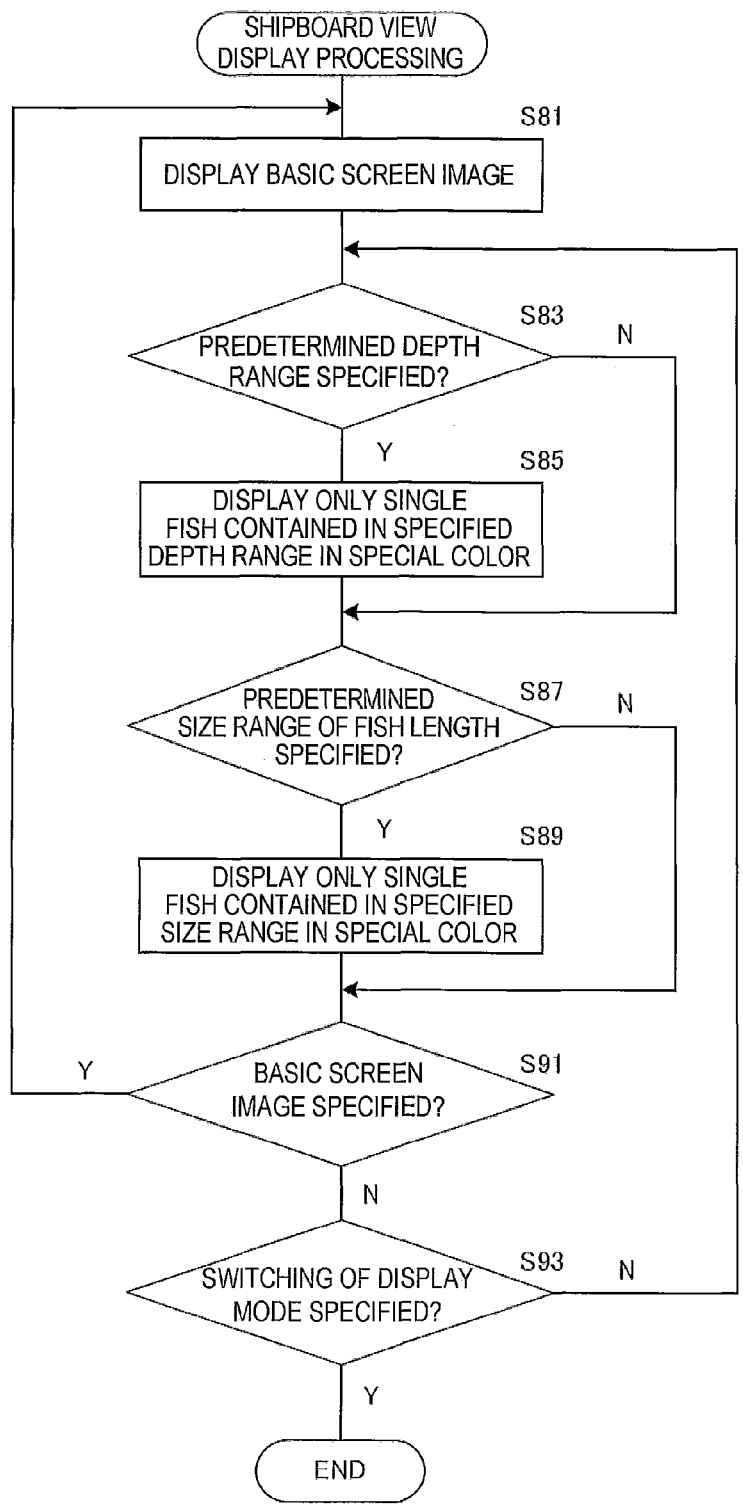
FIG. 14 is a flowchart showing a display procedure of the shipboard view.

FIG. 14 is a flowchart showing a display procedure of the shipboard view. The processing shown in this flowchart is implemented by the display control module 8 executing the processing program stored in the storage medium of the processing information storage module 103.

In FIG. 14, to the single fish observation screen image 9b, a display coordinate by the shipboard view is set and a screen image display (basic screen image display) is performed (Step S81). Specifically, the center O corresponding to the wave transceiver 1, the circumference which shows a directional angle, and line segments showing front and rear, and right and left of the ship are displayed. A circular image which is the first symbol image of the single fish corresponding to every depth range, fish length range, and magnitude of the swimming vector (scalar component), and line segment images which are the second symbol images, stored in the fish information storage module 101 are read out, and displayed in the screen image. The line segment images which are the second symbol images are set so that one end corresponds to the position of the circular image which is the first symbol image, and the line segment is oriented in a direction of the swimming vector.

Subsequently, the display control module 8 determines whether the depth range is specified (Step S83). If the depth range is specified, only the first and the second symbol images of the single fish contained in the specified depth range is changed into a special color which is discriminatable from fish in other depth ranges (Step S85). On the other hand, if the depth range is not specified, the display control module 8 skips Step S85. Subsequently, the display control module 8 determines whether the size range of the fish length is specified (Step S87). If the size range is specified, only the first and second symbol images of the single fish contained in the specified size range is changed into a special color (it may be the same color as Step S85) which is discriminatable from fish in other depth ranges (Step S89). On the other hand, if the size range is not specified, the display control module 8 skips Step S89.

Subsequently, the display control module 8 determines whether the basic screen image display is specified (Step S91). If the basic screen image display is specified, the display control module 8 returns to Step S81 where the basic display screen image is displayed. Otherwise, the display control module 8 proceeds to Step S93 to determine whether switching of the display mode is instructed. If the switching of the display mode is not instructed, the display control module 8 returns to Step S83 to determine whether a new depth range and/or a new size range are/is specified. On the other hand, if the switching of the display mode is instructed, the display control module 8 escapes from this flow.

Figure 15A:
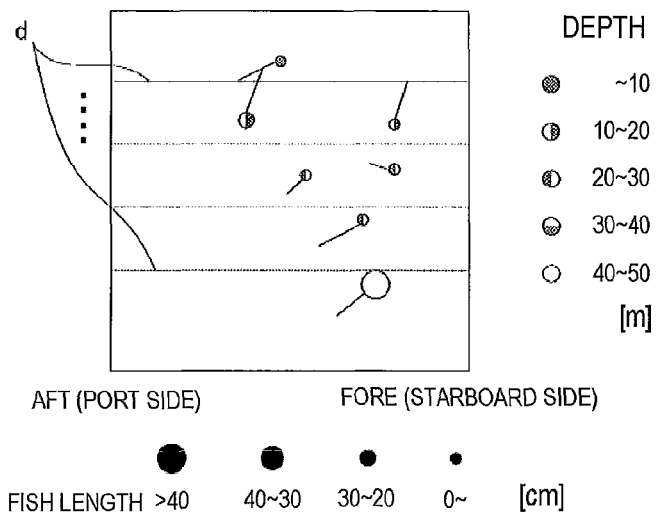
FIGS. 15A and 15B are diagrams illustrating an underwater view displayed in the single fish observation screen image, where
Figure 15B:
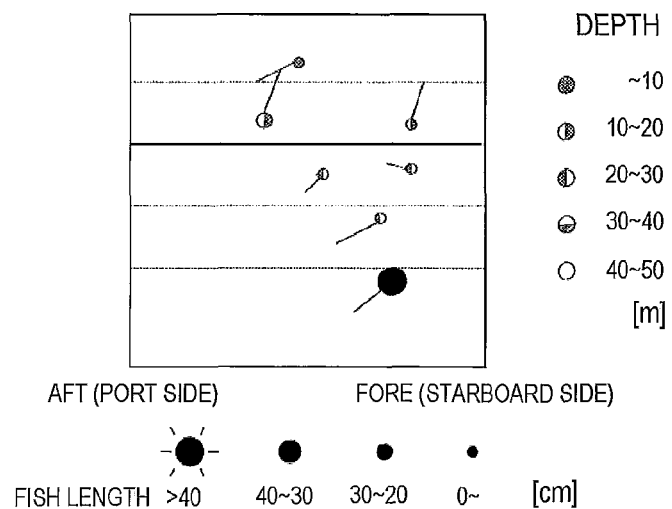

FIGS. 15A and 15B are diagrams illustrating the underwater view displayed in the single fish observation screen image 9*b*, where FIG. 15A is a basic display screen image, and FIG. 15B a screen image when the size range of the fish length is specified.

In FIG. 15A, the basic display screen image has a horizontal axes in the aft-fore direction and the vertical axis in the depth direction. The depth assisting scale L0 for every depth range is also displayed. Each coordinate in the circle C1 is determined by the fore-aft direction and the depth of the received direction of each single fish. The single fish positioned in the coordinates in the screen image is displayed by the first symbol 92*a* and the second symbol 92*b* that constitute the single fish image 92. The number of single fish images 92 displayed corresponds to the number of fish. The first and second symbols that constitute each single fish image are determined according to the setting procedure of the display symbol shown in FIG. 12. The indication which guides the depth and the size of each single fish displayed appears at an appropriate location outside the image.

FIG. 15B shows a screen image supposing a case where the size range of 40 cm or more is specified by the operating module 11 as the fish length in FIG. 15A. In this case, the first symbols 92*a* and the second symbols 92*b* that constitute the respective single fish images 92 of all the fish contained in the specified size range of 40 cm are changed into a special color discriminatable from colors of single fish images outside the specified size range. For example, when the single fish image is displayed by an achromatic shade in the basic display screen image, it is changed into a predetermined chromatic color (e.g., red). The corresponding guides are also changed into the specific color to enable visual recognition of the specified range. Because the wave transceiver 1 can detect the received directions in the front-and-rear direction and the horizontal direction by the four channels CH1-CH4, the horizontal axis may correspond to the portside-starboard in the coordinate system of the display image.

Figure 16:
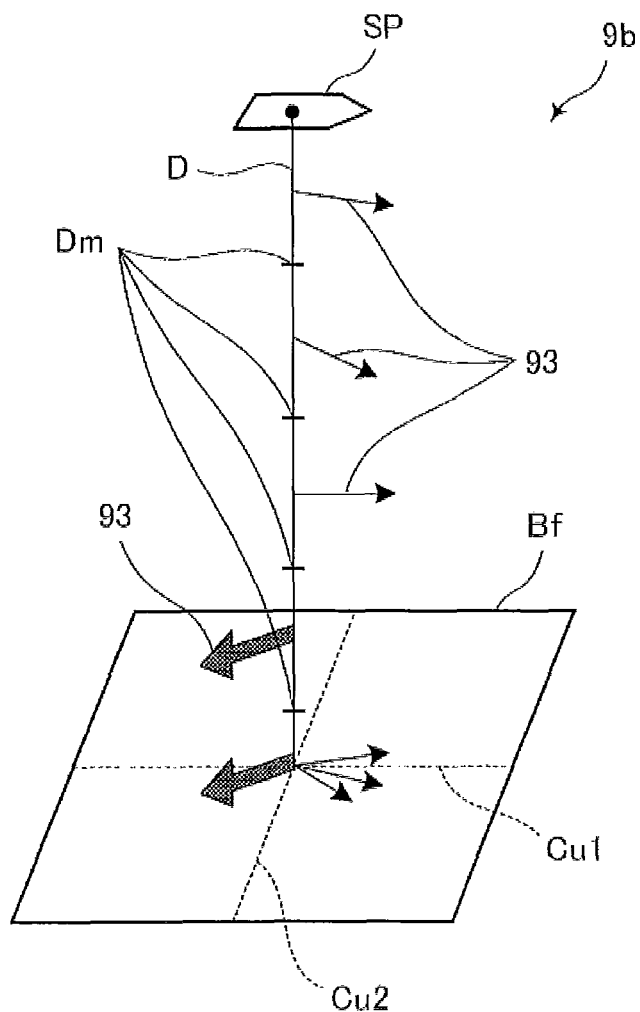
FIG. 16 is a diagram illustrating a 3D view displayed in the single fish observation screen image.

FIG. 16 is a diagram illustrating a 3D view displayed in the single fish observation screen image 9*b*. The 3D view is a bird's-eye view type display image where a vertical line image D is displayed directly below from an image SP which imitates the ship (or an image which imitates the wave transceiver 1), and a sea bed image Bf representing an imaginary sea bed at a lower end thereof is displayed. A scale Dm showing each depth range is displayed in the vertical line image D. Cursors Cu1 and Cu2 showing the fore-aft direction and the portside-starboard direction are displayed in the surface (upper side) of the sea bed image Bf.

In the 3D view, the information related to each single fish is displayed for every depth range. That is, the data calculation module 7 averages the swimming vectors and fish lengths of all the fish which exist within each depth range, and the display control module 8 converts the averaged values into a predetermined symbol (arrow symbol 93 in this embodiment) to be displayed. The arrow symbol 93 contacts the vertical line image D at a base point, and is directed in a radial direction therefrom. On the sea bed image Bf, the arrow symbol 93 for every depth range is projected and displayed. The arrow symbol 93 may have different colors for four directions of fore, aft, portside, and starboard to enable discrimination of the directions.

Figure 17:
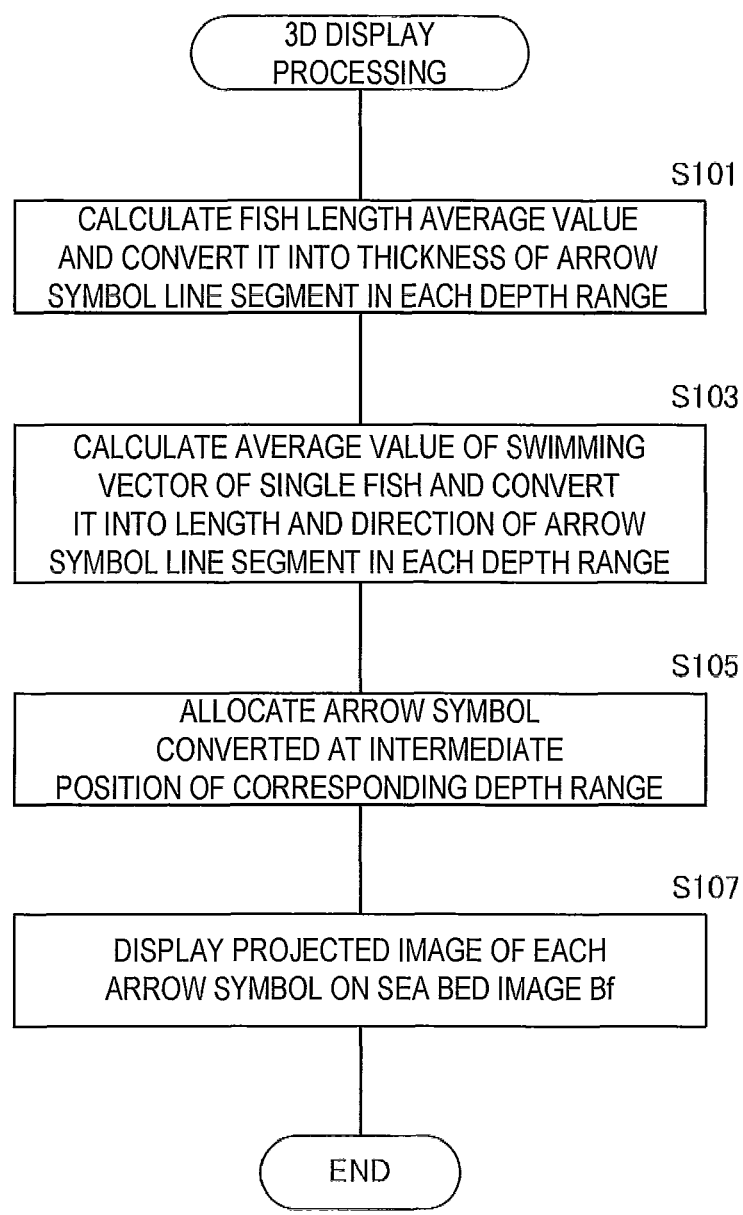
FIG. 17 is a flowchart showing a 3D display procedure.

FIG. 17 is a flowchart showing the 3D display procedure. The processing shown in this flowchart is implemented by the display control module 8 executing the processing program stored in the storage medium of the processing information storage module 103.

As shown in FIG. 17, first, the fish length information on the fish contained in each depth range is read out to calculate the average value. The calculated fish length average value is converted into a predetermined thickness of a line segment of the arrow symbol 93 (Step S101). The swimming vector information on the fish contained in each depth range is then read out to calculate the average value (swimming speed and swimming direction). The calculated swimming vector average value is converted into a predetermined length and direction of the line segment of the arrow symbol 93 (Step S103).

Subsequently, the converted arrow symbol 93 is allocated at an intermediate position of the corresponding depth range in the vertical line image D (Step S105). Further, a projected image of each arrow symbol 93 is displayed in the sea bed image Bf (Step S107).

The arrow symbol 93 is not limited to be displayed in the horizontal plane, but may be displayed in consideration of the depth direction of the swimming vector reflecting the component of the depth direction. In addition, by treating the thickness of the line segment of the arrow symbol 93 as the first symbol and treating the line segment length as the second symbol, the arrow symbol 93 can be treated similar to the single fish image 92 of FIG. 9.

The present invention may also adopt the following configurations.

(1) The received signal processing module 5, the single fish separating module 6, the data calculation module 7, and the display control module 8 may be configured by hardware circuits.

(2) In the above embodiment, although the example in which correlation processing is performed using the matched filter, the correlation processing may be performed using other than the matched filter.

(3) In the above embodiment, as the FM signal, although the signal in which its frequency gradually decreases with time is used, a signal in which its frequency gradually increases with time may also be used. The center frequency and the chirp range of the frequency may also be set suitably.

(4) In the above embodiment, although the FM signal is used, a burst wave of a short pulse which is not FM-modulated may also be used instead. In this case, the matched filter can be omitted and, thus, the configuration can be simplified.

(5) In the above embodiment, although the fish length is derived and displayed as the first symbol 92a, the first symbol 92a may be displayed according to the target strength TS. Further, in a case where a swimming state is needed to be grasped; only the second symbol 92b may be displayed without displaying the first symbol 92a.

(6) The directional width of the wave transceiver 1 is not limited to 7°, but may be a predetermined angle from 5° or 6° up to a predetermined degree (for example, up to about 15°. The wave transceiver 1 is configured by bundling two or more transducers, and its transmitting power increases as the number of the transducers becomes larger, and its directional width becomes narrower accordingly. Therefore, generally, by setting the detectable depth, the directional width can be determined.

(7) The first symbol is not limited to a circle, but may be various graphical figures. the first symbol may adopt other various representing methods, such as changing the shape of the first symbol in a stepwise fashion according to the size range of the fish length. Further, the second symbol is not limited to the length of the line segment according to (or proportional to) the swimming speed, but may adopt other various representing methods. Although the second symbol may be obtained from the calculation result of the swimming vector, it may be displayed as a line segment which simply connects two positions of position information acquired by reception of the last time and this time. By configuring in this way, the vector calculation processing will be simplified.

(8) As the display mode of the measurement results, a relation between a moving direction of the fish and a fish quantity may be adopted instead of the various kinds of display modes (views). For example, a single fish contained in the predetermined direction range is assigned to a single representing moving direction based on the measurement result of the detection depth range, and this assignment is performed for all the fish, to obtain the number of fish for every moving direction. For example, an angle range of $+\pi$ to $-\pi$ is divided by every predetermined angle (e.g., every 45°), and the calculations are made at every 0° (fore direction), ±45°, ±90°, ±135°, and ±$\pi$ (aft direction) as representing moving directions which are half of the respective azimuth directions. As for a displaying method in this case, a graph in which a horizontal axis may be set to azimuth directions centering on 0° and a vertical axis may be set to the fish count, and measurement results are plotted at corresponding coordinate positions on this graph, or may be represented by a publicly known method, such as a bar graph or a line graph. This enables one to grasp a rough moving direction of a school of fish around a ship. The depth direction may not be the entire depth range, but it may be divided by a given predetermined depth, such as "shallow", "middle depth", and "deep," and each sub depth range may be displayed by a graphical representation in a different color from each other. Further, by taking the fish length into each single fish, that is, by setting a weight coefficient according to the fish length to convert the length into fish quantity, the fish quantity and the moving direction can be substantially displayed.

Figure 18:
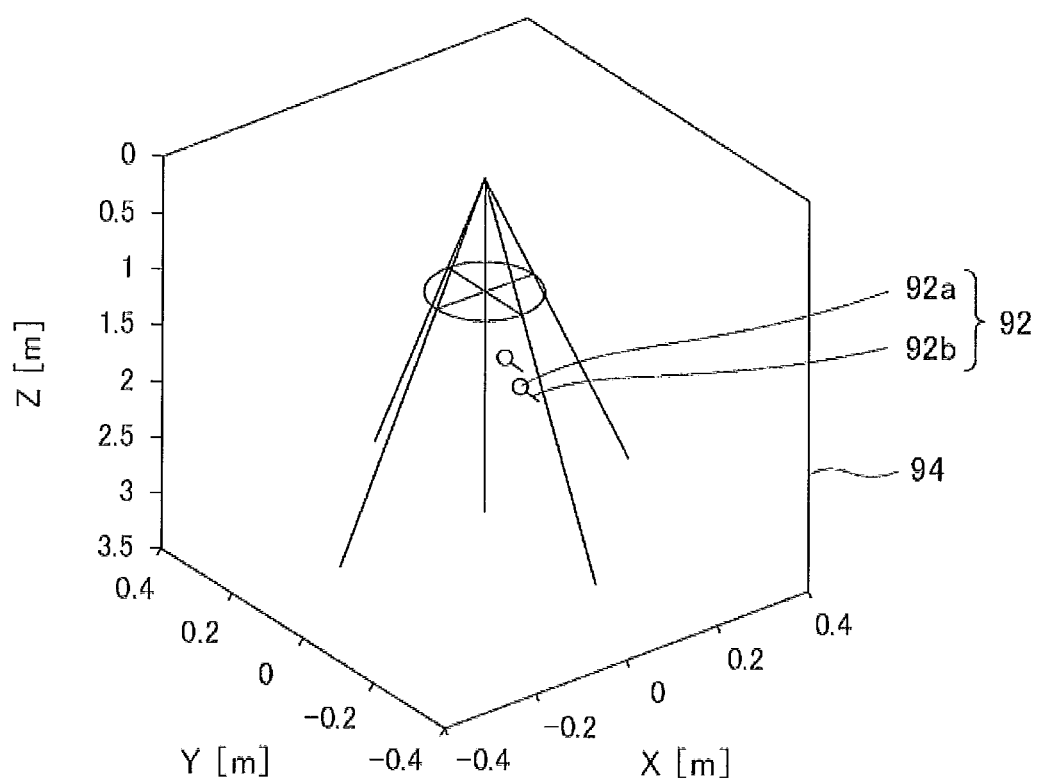
FIG. 18 is a diagram showing another example of the 3D view.

(9) FIG. 18 is a diagram showing another method of the 3D view. FIG. 18 is a diagram looked down from a slanting upper direction of a ship, and a three-dimensional space frame 94 having a scale corresponding to the detection depth range is displayed. A unit distance scale is drawn together with each axis (X, Y, and Z) of the three-dimensional space frame 94. A corresponding position of the self is set in the center of an upper surface of the three-dimensional space frame 94, and a vertical line is displayed toward a sea bed from the ship position, and an inclined line is displayed so as to extend to the sea bed from each of the fore, aft, starboard, and portside directions from the ship position at an angle according to the directional angle. For example, the fore-aft direction may be set to X-axis. In addition, corresponding to a coordinate in the three-dimensional space, the measured single fish may be displayed as the single fish image 92 which is constituted by the first symbol 92a and the second symbol 92b.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any corrections made during the pendency of this application and all equivalents of those claims as issued.

Moreover in this document, relational terms such as first and second, top and bottom, and the like may be used solely to distinguish one entity or action from another entity or action without necessarily requiring or implying any actual relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. An underwater detection device in which an ultrasonic signal having a predetermined beam width is periodically transmitted underwater, and receives a signal reflected on a detection target object moving underwater, generates information on the detection target object based on the received signal, and displays the information on a display module, comprising:

a detection module for periodically detecting the detection target object and a position thereof based on the received signal;

a coupling module for coupling the same detection target objects by associating the same based on the detection target object and the position periodically detected by the detection module;

an image display control module for associating a displacement symbol corresponding to a change in a position of the detection target object with the detection target object coupled by the coupling module, and displaying the displacement symbol at the detected position of the detection target object at least on a two-dimensional position coordinates displayed in the display module;

a calculation module for calculating quantitative information of the detection target object based on the received signal of the detection target object detected by the detection module;

wherein the image display control module associates a quantitative symbol corresponding to the quantitative information of the detection target object with the detection target object coupled by the coupling module, and displays the quantitative symbol at the detected position of the detection target object at least on the two-dimensional position coordinates displayed in the display module so as to be associated with the displacement symbol.

2. The underwater detection device of claim 1, wherein the coupling module excludes, from a candidate for the coupling, the detection target object of which a speed of position change obtained based on the detected position and a transmission cycle exceeds a predetermined value.

3. The underwater detection device of claim 1, wherein the coupling module excludes, from a candidate for the coupling, the detection target object of which a posture angle exceeds a predetermined value based on the positions detected by two consecutive transmissions.

4. The underwater detection device of claim 1, wherein the calculation module calculates information on a length of the detection target object as the quantitative information.

5. The underwater detection device of claim 4, wherein the image display control module changes a size of the quantitative symbol according to the information on the length of the detection target object.

6. The underwater detection device of claim 1, wherein the image display control module displays the quantitative symbol at a position obtained based on the latest received signal.

7. The underwater detection device of claim 6, wherein the image display control module displays, as the displacement symbol, a line segment having a length corresponding to a change in the position from the quantitative symbol toward the position obtained based on the last received signal.

8. The underwater detection device of claim 4, wherein the calculation module calculates the length of the detection target object based on a reflection intensity of the received signal, where it calculates a posture angle of the detection target object in response to two consecutive transmissions of the ultrasonic signal, and corrects the reflection intensity using the posture angle.

9. The underwater detection device of claim 1, wherein the image display control module changes at least a display color of the quantitative symbol for every depth range which is a division of a detection range.

10. The underwater detection device of claim 9, further comprising a depth range selection operating module for allowing one to select a depth range;

wherein the image display control module changes a display color of at least one of the quantitative symbol and the displacement symbol of the detection target object contained in the selected depth range into a specific color.

11. The underwater detection device of claim 4, further comprising a size range selection operating module for allowing one to select a size range of the length of the detection target object;

wherein the image display control module changes a display color of at least the quantitative symbol of the detection target object contained in the selected size range into a specific color.

12. The underwater detection device of claim 1, wherein the image display control module selectively displays in a display mode of a shipboard view where a distance from a vertical line in a radial direction from a center is displayed at an appropriate display location of the display module, and a display mode of an underwater view where a detection distance from an upper part to below is displayed at an appropriate display location of the display module.

13. The underwater detection device of claim 1, wherein the image display control module selectively displays in a display mode of three-dimensional views.

14. The underwater detection device of claim 13, further comprising an average value calculation module for calculating an average value of lengths of the detection target objects for every depth range, and an average value of the position changes;

wherein the image display control module displays the average value of the lengths of the detection target objects and the average value of position changes so as to be associated with a depth range of the three-dimensional view.

15. A method of displaying an underwater detection image, in which an ultrasonic signal having a predetermined beam width is periodically transmitted underwater, receives a signal reflected on a detection target object which moves underwater, generates information on the detection target object based on the received signal, and displays the information on a display module, comprising:

periodically detecting the detection target object and a position thereof based on the received signal;

coupling the same detection target objects by associating the same based on the detection target object and the position periodically detected;

associating a displacement symbol corresponding to a change in a position of the detection target object with the coupled detection target object, and displaying the displacement symbol at the detected position of the detection target object at least on a two-dimensional position coordinates displayed in the display module;

calculating quantitative information of the detection target object based on the received signal of the detection target object;

associating a quantitative symbol corresponding to the calculated quantitative information of the detection target object with the coupled detection target object; and displaying the quantitative symbol at the detected position of the detection target object at least on the two-dimensional position coordinates displayed in the display module so as to be associated with the displacement symbol.

* * * * *